(12) United States Patent
Varlamov et al.

(10) Patent No.: US 9,471,159 B2
(45) Date of Patent: Oct. 18, 2016

(54) INTERACTIVE STYLUS WITH DISCRETE CIRCUIT MULTIPLEXING SYSTEM

(71) Applicant: Microsoft Technology Licensing, LLC, Redmond, WA (US)

(72) Inventors: Denis Varlamov, Portland, OR (US); Jonathan Westhues, Portland, OR (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/567,806

(22) Filed: Dec. 11, 2014

(65) Prior Publication Data

US 2016/0170503 A1    Jun. 16, 2016

(51) Int. Cl.
G06F 3/0354    (2013.01)

(52) U.S. Cl.
CPC ................ *G06F 3/03545* (2013.01)

(58) Field of Classification Search
CPC .... G06F 3/03545; G06F 3/046; G06F 3/044; G06F 3/045
See application file for complete search history.

(56) References Cited

U.S. PATENT DOCUMENTS

| | | | |
|---|---|---|---|
| 4,697,050 A | 9/1987 | Farel et al. | |
| 5,594,562 A * | 1/1997 | Sato et al. | G02F 1/133345 349/12 |
| 2003/0197691 A1 * | 10/2003 | Fujiwara et al. | G06F 3/03545 345/179 |
| 2007/0188480 A1 * | 8/2007 | Teng et al. | G06F 3/03545 345/179 |
| 2008/0055279 A1 * | 3/2008 | Osada et al. | G06F 3/03545 345/179 |
| 2009/0153525 A1 * | 6/2009 | Chang | G06F 3/04883 345/179 |
| 2009/0277694 A1 * | 11/2009 | Hansen et al. | G06F 3/0421 178/18.03 |
| 2014/0028577 A1 * | 1/2014 | Krah et al. | G06F 3/0416 345/173 |
| 2014/0098033 A1 | 4/2014 | Simmons | |
| 2015/0029161 A1 * | 1/2015 | Koo et al. | B43K 29/02 345/179 |
| 2015/0193025 A1 * | 7/2015 | Rebeschi et al. | G06F 3/03545 345/174 |
| 2016/0041635 A1 * | 2/2016 | Michihata et al. | G06F 3/04883 345/179 |

OTHER PUBLICATIONS

ISA European Patent Office, International Search Report and Written Opinion issued in Application No. PCT/US2015/062878, Mar. 14, 2016, WIPO, 12 pages.

* cited by examiner

*Primary Examiner* — Premal Patel
(74) *Attorney, Agent, or Firm* — Brandon Roper; Judy Yee; Micky Minhas

(57) ABSTRACT

A discrete circuit multiplexing system in an interactive stylus is provided. The discrete circuit multiplexing system includes a first electrode and second electrode positioned in a stylus body, with a shared transmitting sub-system coupled to the first electrode and the second electrode. The circuit further includes a microcontroller configured to cause selective transmission of waveforms from the shared transmitting sub-system to the first electrode and the second electrode to selectively stimulate either the first electrode or the second electrode.

19 Claims, 4 Drawing Sheets

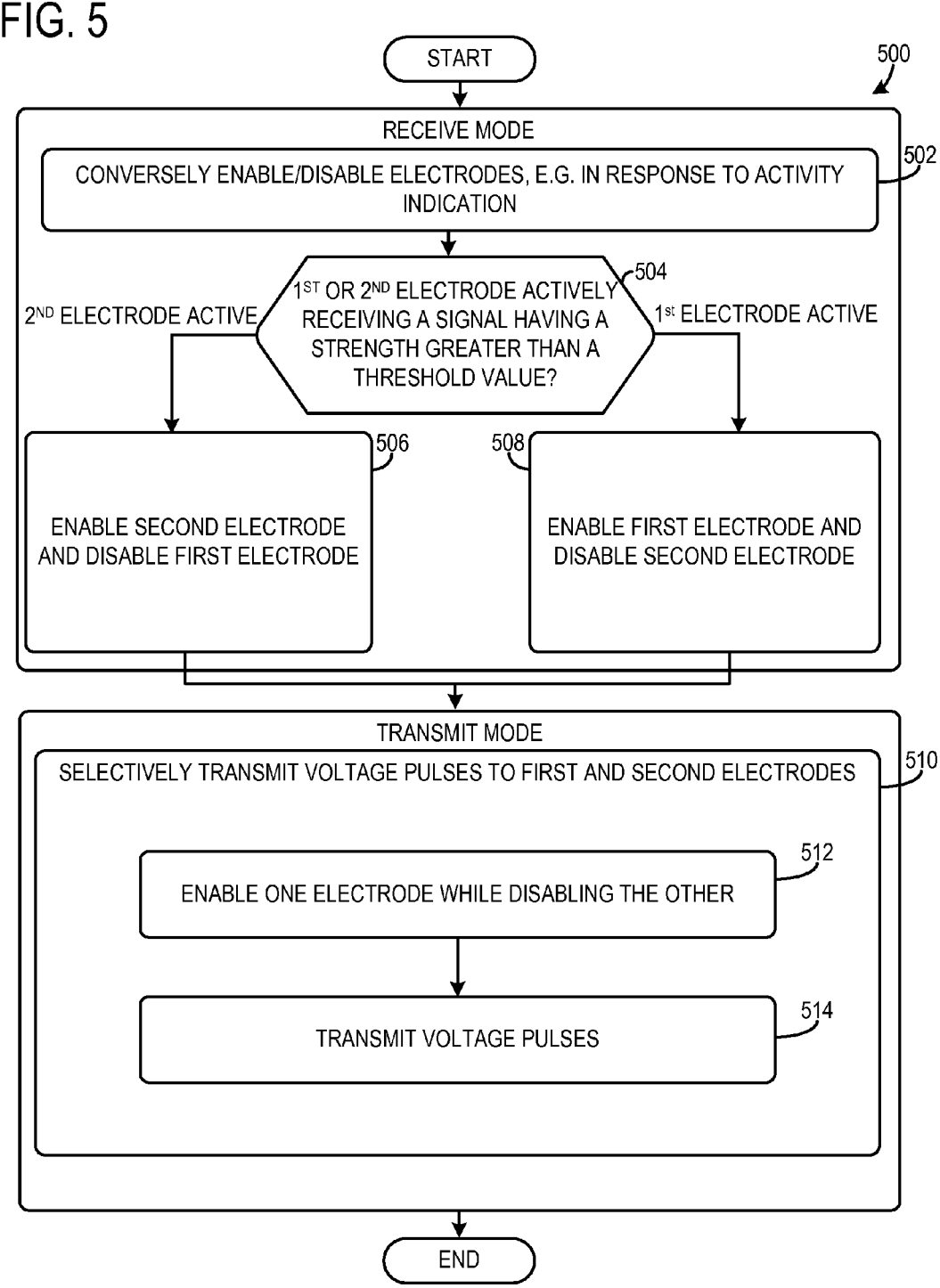

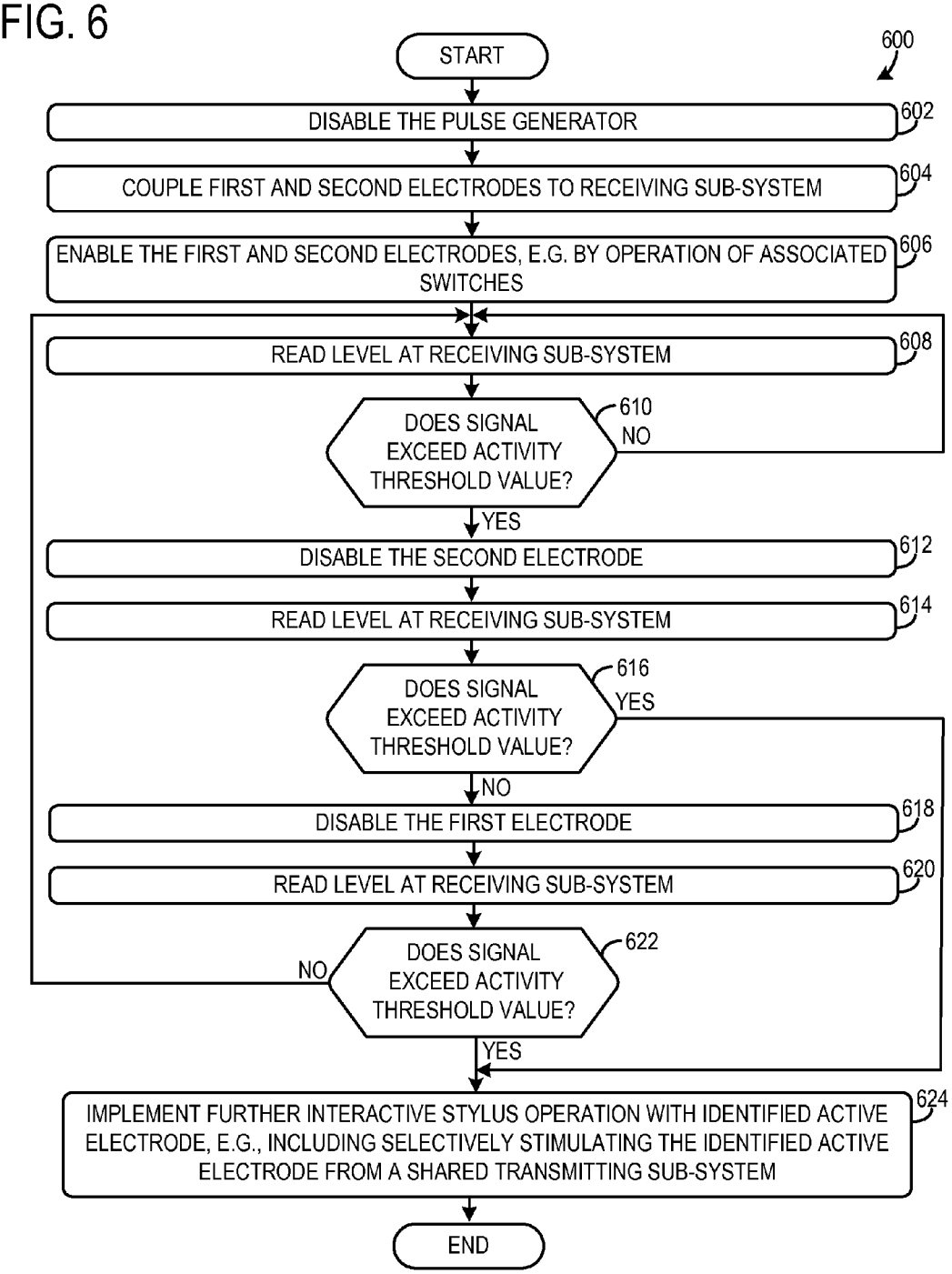

INTERACTIVE STYLUS WITH DISCRETE CIRCUIT MULTIPLEXING SYSTEM

BACKGROUND

Interactive touch sensitive displays are used in a wide array of computing devices. In some cases, it is desirable to employ a stylus in addition to finger touch sensing in order to provide additional functionality. Options for additional functionality may be further enhanced via an active stylus employing a power source, storage, processor, radio transceiver, etc.

Interactive styluses used with touch sensitive displays may provide multiple functions such as drawing functions, erase functions, application launch functions, and/or other command functions. For instance, some styluses may include an ink tip on one end and an eraser tip on another end. The styluses can include multiple electrodes to implement the aforementioned functions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A discrete circuit multiplexing system in an interactive stylus is provided. The discrete circuit multiplexing system includes a first electrode and second electrode positioned in a stylus body, with a shared transmitting sub-system coupled to the first electrode and the second electrode. The circuit further includes a microcontroller configured to cause selective transmission of waveforms from the shared transmitting sub-system to the first electrode and the second electrode to selectively stimulate either the first electrode or the second electrode. This configuration enables the sharing of transmitting and other circuitry between electrodes, which in some settings can decrease complexity, cost, and power consumption.

BRIEF DESCRIPTION OF THE DRAWINGS

FIG. 5 depicts an example method for operating an interactive stylus; and

FIG. 6 depicts another example method for operating an interactive stylus.

DETAILED DESCRIPTION

Figure 1:
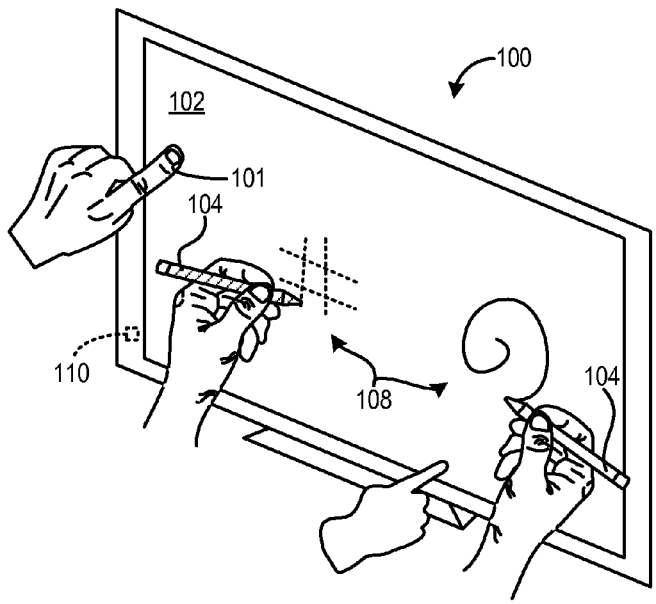
FIG. 1 is a schematic view of an exemplary interactive display system in accordance with an embodiment of the present disclosure.

FIG. 1 depicts an exemplary interactive display system 100 in accordance with an embodiment of the present disclosure. Interactive display system 100 includes an interactive display device 102 configured to concurrently sense input from multiple sources. For example, interactive display device 102 may sense touch input applied by human digits 101, as well as input applied by one or more input devices. The input devices may be in the form of styluses 104, or may be configured in another suitable form factor. As shown and described in more detail below, appropriate graphical output 108 may be generated and displayed in response to receiving input at interactive display device 102.

Figure 2:
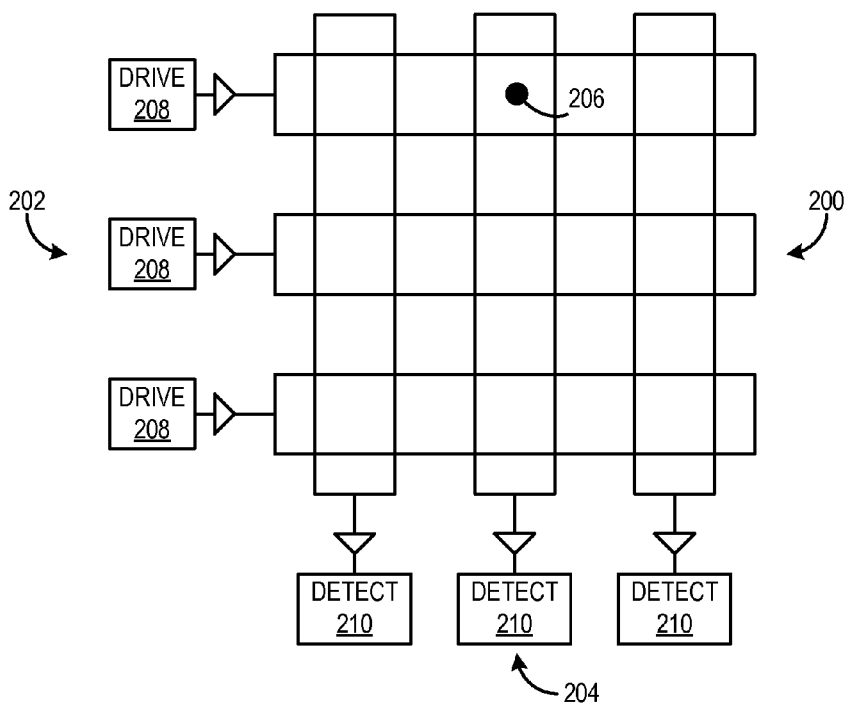
FIG. 2 is a schematic view of an electrode matrix of the interactive display system of FIG. 1.

FIG. 2 schematically shows an exemplary electrode matrix 200 that may be included in the interactive display system 100 to facilitate input detection and provide other functionality. Matrix 200 includes a plurality of row electrodes 202 and a plurality of column electrodes 204. The row and column electrodes are electrically separated from one another and form nodes (e.g., node 206) whose electrical properties (e.g., capacitance) may be monitored to detect touch input and stylus input.

The plurality of row electrodes 202 may be electrically coupled to respective drive circuits 208 configured to drive the row electrodes in various ways. The plurality of column electrodes 204 may be electrically coupled to respective detect circuits 210 which may detect currents and/or voltages in the column electrodes resulting from the driving of the plurality of row electrodes 202, the application of voltages to interactive display device 102 by styluses 104, and/or the touch of digit 101 to the display. Alternatively, detect circuits 210 may instead be coupled to the plurality of row electrodes 202, with the plurality of column electrodes 204 being driven by drive circuits 208. The electrode matrix 200 so constructed may be used to detect not only touch inputs from the digit of a user, but also to ascertain at least one coordinate of the position of an input device such as the stylus 104. It will be appreciated that the number of rows and columns shown in FIG. 2 is for illustrative purposes only, and that in a typical display many more columns and rows are included in matrix 200 than are illustrated in FIG. 2.

Figure 3:
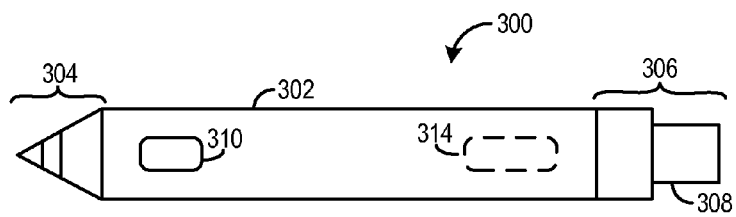
FIG. 3 depicts an example interactive stylus which may be used with the interactive display system.

FIG. 3 shows an example interactive stylus 300. Stylus 300 may be used with the interactive display device 102 of FIG. 1, and thus is an example implementation of interactive stylus 104. Stylus 300 may be configured to trigger various functions in the display device 102 such as drawing, erasing, application launch, etc. As shown, interactive stylus 300 includes a stylus body 302, which may house various internal components. These internal components may include a discrete circuit multiplexing system 400, which is described in detail with reference to FIG. 4.

Interactive stylus 300 includes a first end 304 and a second end 306. In some example implementations, the first end 304 is an ink end used to provide a drawing/ink function/mode, and the second end 306 is an eraser end for providing an erase function/mode. An actuator such as button 310 may also be included to provide various additional functionality. Although the examples herein refer repeatedly to drawing (or inking) and erasing, the present discussion is applicable more generally to any functionality that is provided via two or more stylus electrodes that interact electrostatically with components on an associated interactive display device 102.

The electrodes of stylus 300 and matrix 200 may be operated in transmit and receive modes. When the stylus is operated in a transmit mode and the matrix is in a receive mode, one or more electrodes of the stylus 300 are driven in order to capacitively couple signal into matrix 200. The signal received at matrix 200 may be processed in order to sense a relative position of the stylus electrode(s) and matrix 200, to aid in establishing/maintaining a shared sense of timing between the stylus 300 and interactive display device 102, to transmit other data, etc. When the stylus 300 is operated in a receive mode and the matrix 200 is transmitting, one or more of the matrix electrodes are driven in order to transmit a capacitively coupled signal into one or more electrodes of the stylus 300. This coupled signal can similarly be used for position sensing, obtaining time synchronization, etc. Additional and/or supporting interaction can be provided via a radio link between the devices (e.g., as implemented by transceivers 110 and 314).

Figure 4:
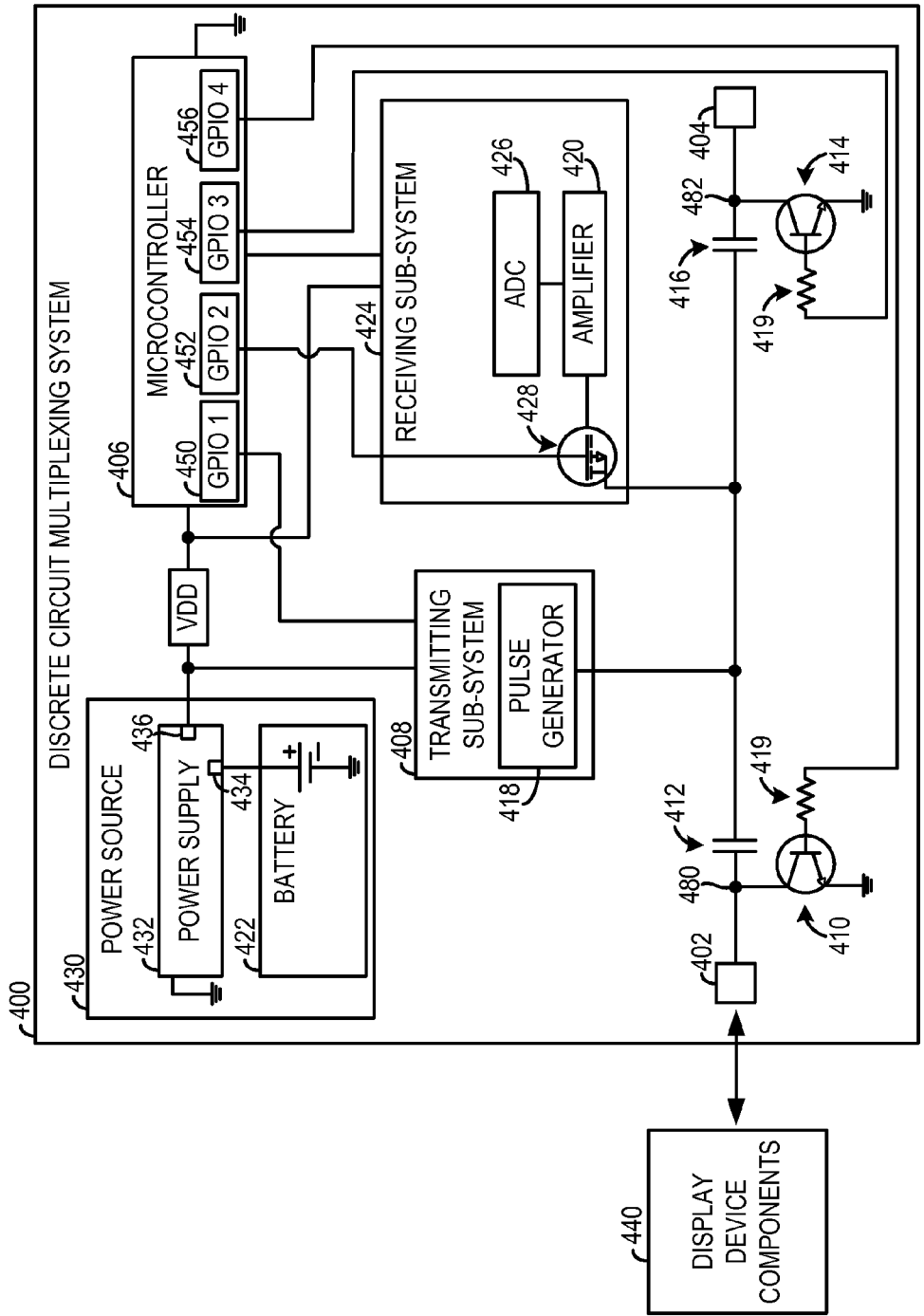
FIG. 4 depicts a discrete circuit multiplexing system that may be included in the interactive stylus shown in FIG. 3.

FIG. 4 shows a schematic illustration of a discrete circuit multiplexing system 400 which may be included in the interactive stylus 300 of FIG. 3. System 400 includes a microcontroller 406 and a power source 430 which supplies voltage/power to various system components. Microcontroller 406 coordinates and controls activity of transmitting sub-system 408 and receiving sub-system 424 to support electrostatically-coupled input and output functions for electrodes 402 and 404. The first electrode 402 may be positioned in the first end 304 of the stylus body 302, shown in FIG. 3. The second electrode 404 may be positioned in the second end 306 of the stylus body 302, shown in FIG. 3. In this way, the first and second electrodes (402 and 404) may be positioned on opposing sides of the interactive stylus 300. Such a configuration may be desirable, again, in order to provide an ink mode at one end of the stylus 300 and an erase mode at the other end.

Power source 430 may be configured in various ways to support the functionality described herein. In the depicted example, power source 430 includes a battery 422, which may be a lithium ion battery or other suitable battery type. Battery 422 may have a nominal voltage of 3.7V, though other voltage levels may be employed as appropriate to a given setting. Power source 430 may further include a power supply 432 coupled to battery 422 and receiving an input 434 (from the battery) and providing an output 436 to generate voltage VDD for powering other components in the system. In other examples, power supply 432 may be omitted from the power source 430 when the battery has a particular chemistry and the components in the system (i.e., pulse generator, microcontroller, etc.,) are selected to operate with voltage/current supplied directly from the battery.

In general, microcontroller 406 causes the stylus 300 to operate in either a receive mode or a transmit mode. During transmit, voltage pulses generated by transmitting sub-system 408 are used to selectively stimulate either the first electrode 402 or the second electrode 404, as will be explained in detail below, and the receiving sub-system 424 is decoupled via operation of a switch to prevent pulses transmitted by the transmitting sub-system from being received into the receiving sub-system. During receive mode, the transmitting sub-system is inactive and the receiving sub-system is switched on to receive and process signals capacitively coupled into electrodes 402 and 404 as a result of matrix 200 being stimulated.

FIG. 4 specifically shows transmit/receive functionality with respect to one of the stylus electrodes. In particular, the first electrode 402 is indicated as sending signals to and receiving signals from display device components 440. The display device components 440 may be included in the interactive display device 102, and may include the electrodes and detect/drive circuits discussed with reference to FIG. 2. It will be appreciated that the other electrode (e.g., the second electrode 404) may also interact electrostatically with display device components 440.

In the depicted examples, transmitting componentry (e.g., transmitting sub-system 408) is shared among electrodes 402 and 404. In many cases, such sharing of componentry can reduce complexity, cost and power consumption within the stylus. The sharing may be facilitated via various switching topologies and operation. In the example of FIG. 4, system 400 includes a first switch 410 coupled to a first capacitor 412, and a second switch 414 coupled to a second capacitor 416. More specifically, the first switch 410 is coupled between the first electrode 402 and the first capacitor 412, and the second switch 414 is coupled between the second electrode 404 and the second capacitor 416.

The first switch 410 is controlled by microcontroller 406 to selectively ground and unground electrode 402 and node 480, which is positioned between capacitor 412 and electrode 402. When the first switch 410 is operated to ground the electrode/node, electrode 402 is disabled. When the first switch 410 is turned off, the electrode 402 is ungrounded and is enabled for operation. An enabled electrode can both transmit and receive signals (i.e., to from matrix 200 of FIG. 2), whereas a disabled electrode has a drastically reduced transmit and receive signal amplitude/capability. In addition, disabling one of the electrodes by closing one of the switches to ground (410 and 414) creates a current divider path through the corresponding capacitor (412 and 416) to ground, which reduces the amount of both transmitted and received current to and from the active electrode. However, in the case of the received signal, incoming in-band noise is attenuated by the same amount, thereby preserving a desired signal to noise ratio. Signal loss through the current divider path due to a disabled electrode can be compensated for by increasing the gain of an amplifier 420, discussed in greater detail herein, and by increasing the voltage output of the pulse generator 418, in one example, if desired.

The second switch 414 is also controlled by microcontroller 406. The second switch 414 is operated to selectively ground and float electrode 404 and node 482. Grounding disables the electrode 404; floating enables the electrode 404. The above discussion relating to current dividers, attenuation, SNR, etc. applies equally to the operation of second switch 414 and its associated components.

During transmit, the desired electrode (402 or 404) is enabled and relatively high voltage pulses are provided from pulse generator 418 under control of microcontroller 406. This provides the desired stimulation of the enabled electrode to capacitively couple appropriate signals into electrode matrix 200 (for position sensing, time synchronization, etc.). Different switch mode power supply topologies may be used to generate necessary voltage and to control the timing of the pulses from the pulse generator, such as a boost converter, a flyback converter, etc. Other ways of generating the high voltage may also be employed. For example, a charge pump circuit could be used. As will be described below, various methods may be employed to determine which of the electrodes to enable during transmission. Voltage pulses of approximately 100 volts in amplitude may be used, though other levels may be employed to provide the desired signal at the receive circuitry of matrix 200. The first and second switches 410 and 414 typically are configured to withstand the relatively high voltages produced by a pulse generator 418. As shown, resistors 419 of appropriate value may be coupled to enabling terminals of the first and second switches. Also, it typically will be desirable to place the capacitors 412 and 416 close/adjacent to their respective electrodes in order to reduce energy loss in the circuit due to additional parasitic capacitance to ground.

The values of capacitors 412 and 416 may vary. When a selected electrode is enabled for selective stimulation, having a relatively large capacitance at its associated capacitor is desirable so that the large majority of the transmitted voltage pulse is experienced at the enabled electrode to provide a desired signal strength. However, in the depicted examples this capacitor also creates a current divider path to ground when its associated electrode is disabled (i.e., when the other electrode is enabled and being stimulated). This decreases the overall efficiency during transmit cycles relative to if a smaller capacitance were used, because more energy is needed to charge the larger total capacitance to a given voltage. Typically, both capacitors are of the same size and are selected to have a value that balances these considerations. In some settings, it may be desirable to select a capacitance that results in approximately 90% of the amplitude being delivered by pulse generator 418 to be experienced at the enabled electrode.

In further examples, each switch/capacitor arrangement (i.e., 410/412 and 414/416) may be replaced with a high-side switch (e.g., a FET switch). In this alternate configuration, the high-side switches may be coupled in series with the electrodes (402 and 404) and operated via signals from microcontroller 406. Using high-side switches in some settings can improve the efficiency of the system by providing a higher impedance in the current divider to reduce energy losses.

The stylus may also be configured to include receiving componentry shared by multiple stylus electrodes. In addition to receiving signals used for position sensing, synchronization, etc., the receiving componentry may be used to aid in determining which stylus electrode to enable during transmission mode. Referring specifically again to the example of FIG. 4, system 400 includes a receiving sub-system 424 having an amplifier 420 (e.g., a transimpedance amplifier) coupled to the stylus electrodes via the first capacitor 412 and the second capacitor 416. Amplifier 420 is thus configured to receive electrostatically-coupled signals from both the first electrode 402 and the second electrode 404 (when either or both are enabled), which respectively travel through/across capacitors 412 and 416. The receiving sub-system 424 may be configured to operate as a low-input-impedance current-conditioning circuit. Additionally, the amplifier 420 may also be configured to convert, filter, and/or amplify current pulses (e.g., high frequency current pulses), as appropriate, coming from either the first electrode 402 or the second electrode 404.

In the depicted example, the receiving sub-system 424 also includes an analog to digital convertor (ADC) 426 coupled to amplifier 420. Thus, the ADC 426 is configured to receive analog signals from the amplifier 420 and provide digital signals for interpretation by microcontroller 406. Though depicted as a separate component, some or all of the receiving sub-system may be incorporated into microcontroller 406.

A third switch 428 may also be included in receiving sub-system 424. Switch 428 may be implemented as a high-side series switch or in any other appropriate configuration. In the depicted example, switch 428 is positioned between and coupled to the amplifier 420 and the first and second capacitors (412 and 416). Switch 428 is controlled by microcontroller 406 to selectively connect and disconnect the receiving sub-system 424 from the first and second capacitors (412 and 416) and therefore from the first and second electrodes (402 and 404). In this way, the receiving functionality of the circuit may be disabled at desired time intervals, for example when one of the stylus electrodes is being stimulated by pulse generator 418 to capacitively couple signal into matrix 200. Also, as indicated, switch 428 may be used to isolate receiving sub-system 424 from transmitting sub-system 408, so that transmit current pulses are not coupled into the receiving sub-system during stylus electrode transmit operation.

As discussed, the microcontroller 406 is configured to variously control operation of the first switch 410, the second switch 414, the receiving sub-system 424 (e.g., the third switch 428), and the transmitting sub-system 408 (e.g., pulse generator 418). General purpose input/outputs (GPIOs) may be provided in the microcontroller 406 to provide the desired control/switching. Specifically, in the depicted example, the microcontroller includes a first GPIO 450 coupled to the transmitting sub-system 408 (e.g., pulse generator 418), a second GPIO 452 coupled to the receiving sub-system 424 (e.g., third switch 428), a third GPIO 454 coupled to the second switch 414, and a fourth GPIO 456 coupled to the first switch 410.

As discussed above, when the stylus 300 is being used to electrostatically transmit signal to matrix 200, the microcontroller 406 (and/or other componentry in the stylus 300 and/or display device 102) may be used to first determine which of electrodes 402 and 404 are to be stimulated. As discussed in more detail, this determination may be made by processing signals received into the receiving sub-system from the first and second electrodes. In response to this determination, signal from the shared transmission circuitry is directed to the operative electrode. For example, if the user intends to use the first electrode 402 (e.g., to perform an inking/write function with one end of the stylus 300), the microcontroller 406 operates switches 410 and 414 so that node 480 floats (enabling electrode 402) and node 482 is grounded (disabling electrode 404). Conversely, if the user for example desires to use the other end/electrode for an erasing operation, the microcontroller 406 operates the switches in an opposite manner, so that transmitted waveforms instead stimulate electrode 404. In this way, stimulation is provided only on the electrode or electrodes that the user desires.

The user's intent to activate the first electrode 402 or second electrode 404 may be determined based on the proximity of the electrode to the interactive display device (e.g., interactive display device 102). In one example, the states of switches 410, 414 and 428 are controlled to determine which electrode is closer to the interactive display device. These state manipulations cause the signal received into receiving sub-system 424 to vary, and the received levels are interpreted/processed by microcontroller 406 to determine which electrode is closer to the interactive display.

During proximity detection, transmitting sub-system 408 and pulse generator 418 are inactive, and switch 428 is closed to enable signals received via the electrodes to be detected at receiving sub-system 424 and/or microcontroller 406. Initially, both electrodes 402 and 404 may be enabled (e.g., by floating nodes 480 and 482) while receiving sub-system 424 "listens" for some minimum indication of activity at the electrodes—e.g., a level above some activity threshold value sensed at ADC 426. When such an indication is received, because of the shared receiving componentry and enablement of both electrodes, it is not initially known whether the activity is due to signal being received by the first electrode 402 or by the second electrode 404. As described below, microcontroller 406 may then conversely enable the electrodes to determine which electrode is active (which in turn enables a determination that that electrode is active and/or more proximate to the display device, e.g., to matrix 200).

Specifically, in the depicted example, the microcontroller 406 is configured to conversely enable and disable the first and second electrodes (402 and 404) while the receiving sub-system remains enabled with switch 428. This converse operation may include one or both of (1) closing the first switch 410 and opening the second switch 414 during a first time interval; and (2) opening the first switch 410 and closing the second switch 414 during a second time interval. Signals received by the receiving sub-system 424 during these two time intervals—e.g., as a result of one or more electrodes of matrix 200 being driven—are analyzed to determine which electrode is closer to the matrix. In some examples, a determination may be made immediately after testing at the first interval. For instance, if sufficient activity is detected when the first electrode 402 is enabled while the second electrode 404 is disabled, the processing flow may be implemented to immediately assume that the first electrode 402 is responsible for the inbound activity.

Threshold assessment may be employed—in particular, converse operation of the switches/electrodes may be used to enable the microcontroller 406 to determine which of the two electrodes 402 and 404 is actively receiving a signal having an activity metric greater than a threshold value. For example, if the receiving sub-system 424 receives a signal with amplitude greater than a threshold value while first electrode 402 is disabled and the second electrode 404 is enabled, it can be inferred (1) that the second electrode 404 is active (e.g., proximate to or in contact with a display device electrode matrix); and (2) that the user intends to use the second electrode 404. On the other hand, if the receiving sub-system 424 receives a signal with amplitude greater than the threshold value while first electrode 402 is enabled and the second electrode 404 is disabled, it can conversely be inferred that the user intends to use the more-proximate first electrode 402. Once such a determination is made, and as discussed above, switches 410 and 414 may then be controlled in concert with transmitting sub-system 408 so that only the identified active electrode is stimulated during transmit operation.

It will be appreciated that the above examples allow a single transmitting sub-system to be shared among multiple electrodes. Specifically, operation of the described microcontroller, receiving sub-system and associated switches enables an intelligently-controlled sharing of a pulse generator. In some settings this can reduce the cost, complexity and power consumption associated with supporting multiple stylus electrodes.

FIG. 5 shows a method 500 for operating an interactive stylus. The method 500 may be implemented through operation of the interactive styluses discussed above with regard to FIGS. 1-4 or may be implemented via other suitable interactive styluses.

Step 502 occurs during a receive mode of operation, and includes conversely enabling and disabling a first stylus electrode and a second stylus electrode. In particular, the converse operation may include (1) enabling the first electrode while disabling the second electrode in a first interval; and (2) disabling the first electrode while enabling the second electrode in a second interval. Typically, as shown in the figure and described in the examples above, this is performed in response to first receiving some indication of general activity at the electrodes, e.g., a signal above some threshold value. For example, both electrodes may first be enabled and the system may otherwise be configured so that any signals present on the stylus electrodes are provided to a receiving sub-system. The converse operation could then be triggered in response to the receiving sub-system detecting a signal above some threshold level. At that point, the system would not know which electrode was responsible for the inbound signal. The triggered converse operation of step 502 is then performed to ascertain which electrode is responsible for the threshold being exceeded.

Continuing with step 502, the enablement and disablement may be performed as described above in connection with FIG. 4. In particular, a given electrode may be enabled and disabled by operating a switch to float/ground the electrode. And in many cases, it will further be desirable that the floated/grounded node be positioned between the electrode and a capacitor coupled to other circuitry in the system (e.g., capacitors 412 and 416 of FIG. 4).

At 504, the method includes determining which of the two electrodes is responsible for the indication of activity. Specifically, this may be implemented by assessing levels (e.g., at receiving sub-system 424) existing during one or both of the intervals of step 502. If a signal with amplitude greater than some threshold is present when the first electrode is enabled and the second electrode is disabled, it can be inferred that the first electrode is the active electrode (e.g., closer to the interactive display device than the second electrode). Conversely, it will be inferred that the second electrode is active if the threshold is exceeded when the second electrode is enabled and the first electrode is disabled. And as discussed above, the processing may be implemented to identify an active electrode after only one converse electrode state is assessed, i.e., without needing to also assess levels associated with the opposite converse enabling of the electrodes.

Steps 506 and 508 may be performed to prepare for a transmit mode of operation. Specifically, if it is determined that the second electrode is active, then the first electrode is disabled and the second electrode is enabled at 506. As described above, disablement may be performed by grounding the electrode (e.g., with a switch), and more particularly by operating a switch to ground a node positioned between the electrode and a capacitor coupled between the electrode and remaining stylus circuitry. Enablement would be performed by floating the electrode (decoupling it from ground). Conversely, step 508 shows operation if it is determined that the other electrode is active. The electrode determined to be active is thus enabled so that it will be appropriately driven during transmit mode (e.g., through operation of a pulse generator such as that described with reference to FIG. 4).

At 510, the method includes transmit mode operation in which voltage pulses are selectively transmitted to the first and second electrodes. As described above, the selective transmission may result from only enabling the electrode that is to be stimulated. The method therefore includes enabling one electrode while disabling the other, as shown at 512 (i.e., performing step 506 or 508 depending on which electrode is determined to be active). At 514, voltage pulses are transmitted and the converse enablement of the electrodes causes selective stimulation of only one of the electrodes.

As discussed above, selectively transmitting voltage pulses may include sending voltage pulses to either the first electrode or the second electrode based on operating conditions of the interactive stylus. In one example, the operating conditions are based on stylus position, i.e., voltage pulses are transmitted to the stylus end/electrode that is more proximate to or in contact with an associated interactive display device. In another example, the operating conditions may include an inference about user intent, i.e., pulses are transmitted to one electrode based on a determination that the user intends to use that electrode. Typically, intent is inferred through the described use of a receiving sub-system (as in FIG. 4) to detect a relatively higher inbound signal strength at one of the electrodes, though other methods of inferring intent may be used. For example, the interactive display device may employ another communication channel such as a radio link to selectively enable or disable stylus electrodes based on the need of the application, or a stylus of known orientation used with a digitizer of known orientation (e.g., where that orientation is determined using an accelerometer or compass) may select the electrode that points toward the digitizer.

Although method 500 may be performed in connection with systems other than those shown in FIGS. 1-4, in some settings it may achieve similar benefits. For example, making a determination of which electrode is active and selectively stimulating it through voltage pulses delivered from a shared source may reduce cost, complexity and power consumption of an active stylus.

FIG. 6 shows another method 600 for operating an interactive stylus. The method 600 may be implemented through operation of the interactive styluses discussed above with regard to FIGS. 1-4 or may be implemented via other suitable interactive styluses. That said, the method does contemplate: (1) a first electrode which may be selectively enabled with a first switch; (2) a second electrode which may be selectively enabled with a second switch; (3) a receiving sub-system which may be selectively coupled to the electrodes via operation of a third switch; and (4) a pulse generator for providing voltage pulses to the first and second electrodes.

At 602, the pulse generator is disabled (because the system is being operated in a "listening" or receive mode). At 604 the method includes enabling the first and second electrodes, for example by operating their associated switches. At 606, the receiving system is coupled to the electrodes, for example by operating its associated switch. At 608, levels are read at the receiving sub-system (e.g., via output from an ADC) and an assessment is made at 610 as to whether an activity threshold value is exceeded. Once the activity threshold is exceeded, it is assumed that this is a result of non-negligible signal being capacitively coupled into either or both the first electrode or the second electrode. But since both electrodes are enabled and feeding into the shared receiving sub-system, it is not known which electrode is producing the signal that caused the threshold to be exceeded.

Accordingly, once the threshold is exceeded, the method proceeds to conversely enabling the electrodes to determine which is responsible for the threshold being exceeded. For example, as shown at 612 and 614, only the second electrode is disabled and the level is again read at the receiving system. If the level exceeds a threshold (step 616), then it may be inferred that the signal activity is due to a signal being capacitively coupled into the first electrode. The method may then proceed at 624 to implement further stylus operation with the identified stylus electrode, such as individually enabling it to be stimulated by pulses from a pulse generator shared with the other electrode. If the threshold is not exceeded, processing may then proceed to testing the second electrode. Specifically, the first electrode is disabled at 618 while the second electrode is enabled, and the level is again read at the receiving sub-system (step 620). If a threshold is exceeded, it is then presumed that the signal activity is due to a signal being capacitively coupled into the second electrode, and processing continues at 624 using the second electrode as the identified active electrode. If neither test results in a detected threshold activity level, then processing flow may revert to the initial listening operation described with reference to steps 602, 604, 606 and 608.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The subject matter of the present disclosure is further described in the following paragraphs. According to one aspect, a discrete circuit multiplexing system in an interactive stylus is provided. The discrete circuit multiplexing system includes a stylus body; a first electrode and a second electrode positioned in the stylus body; a shared transmitting sub-system coupled to the first electrode and the second electrode; and a microcontroller configured to cause selective transmission of waveforms from the shared transmitting sub-system to the first electrode and the second electrode to selectively stimulate either the first electrode or the second electrode.

In this aspect, the microcontroller may be configured to (i) cause selective stimulation of the first electrode by enabling the first electrode and disabling the second electrode; and (ii) cause selective stimulation of the second electrode by enabling the second electrode and disabling the first electrode. In this aspect, the discrete circuit multiplexing system may further include a first capacitor coupled between the shared transmitting sub-system and the first electrode, the microcontroller being configured to disable the first electrode by grounding a first node positioned between the first capacitor and the first electrode and enable the first electrode by floating the first node; and a second capacitor coupled between the shared transmitting sub-system and the second electrode, the microcontroller being configured to disable the second electrode by grounding a second node positioned between the second capacitor and the second electrode and enable the second electrode by floating the second node.

In this aspect, the discrete circuit multiplexing system may further include a receiving sub-system configured to receive signals from the first electrode and the second electrode, the microcontroller being configured to process such received signals to determine which of the first electrode and the second electrode is to be selectively stimulated by the shared transmitting sub-system.

In this aspect, the microcontroller may be configured to conversely enable and disable the first electrode and the second electrode and determine, based on signals received at the receiving sub-system as a result of such converse operation, which of the first and second electrodes is to be selectively stimulated by the shared transmitting sub-system.

In this aspect, the microcontroller may be configured: to cause the shared transmitting sub-system to selectively stimulate the first electrode if the receiving sub-system receives a signal greater than a threshold value when the first electrode is enabled and the second electrode is disabled;

and to cause the shared transmitting sub-system to selectively stimulate the second electrode if the receiving sub-system receives a signal greater than a threshold value when the first electrode is disabled and the second electrode is enabled.

In this aspect, the first electrode may be positioned in a first end of the stylus body and the second electrode may be positioned in a second end of the stylus body.

In this aspect the discrete circuit multiplexing system may further include a first capacitor coupled between the shared transmitting sub-system and the first electrode; a first switch configured to ground and unground a first node positioned between the first electrode and the first capacitor; a second capacitor coupled between the shared transmitting sub-system and the second electrode; and a second switch configured to ground and unground a second node positioned between the first electrode and the first capacitor.

In this aspect, in response to a determination of a user's intent to use the first electrode, the microcontroller may be configured to disable the second electrode and enable the first electrode so that, when operated, the shared transmitting sub-system stimulates the first electrode; and where in response to a determination of a user's intent to use the second electrode, the microcontroller may be configured to disable the first electrode and enable the second electrode so that, when operated, the shared transmitting sub-system stimulates the second electrode.

In this aspect, in response to a determination that the first electrode is more proximate to an interactive display than the second electrode, the microcontroller may be configured to disable the second electrode and enable the first electrode so that, when operated, the shared transmitting sub-system stimulates the first electrode; and where in response to a determination that the second electrode is more proximate to an interactive display than the first electrode, the microcontroller is configured to disable the first electrode and enable the second electrode so that, when operated, the shared transmitting sub-system stimulates the second electrode.

In this aspect, the first electrode may be configured to provide an ink mode of operation for the interactive stylus and the second electrode may be configured to provide an erase mode of operation for the interactive stylus.

According to another aspect, a method for operating an interactive stylus having a first electrode and a second electrode is provided. The method includes receiving, via a receiving sub-system coupled to the first electrode and the second electrode, a signal exceeding an activity threshold value; in response to the activity threshold value being exceeded, conversely enabling and disabling the first electrode and the second electrode; during the conversely enabling and disabling, reading levels received at the receiving sub-system to identify which of the first electrode and the second electrode is active; and selectively stimulating the identified active electrode via waveforms from a shared transmitting sub-system coupled to the first electrode and the second electrode.

In this aspect, selectively stimulating the identified active electrode may include enabling the identified active electrode and disabling the other of the first electrode and the second electrode.

In this aspect, a first capacitor may be coupled between the shared transmitting sub-system and the first electrode, the first electrode being disabled by grounding a first node between the first capacitor and the first electrode and enabled by floating the first node; and a second capacitor may be coupled between the shared transmitting sub-system and the second electrode, the second electrode being disabled by grounding a second node between the second capacitor and the second electrode and enabled by floating the second node.

In this aspect, the first electrode may be configured to provide an ink mode of operation for the interactive stylus and the second electrode may be configured to provide an erase mode of operation for the interactive stylus.

In this aspect, the first electrode may be positioned in a first end of the interactive stylus and the second electrode may be positioned in a second end of the interactive stylus.

In this aspect, the method may further include disabling a switch between the receiving sub-system and the first electrode and the second electrode while the shared transmitting sub-system stimulates the identified active electrode.

According to another aspect, a discrete circuit multiplexing system in an interactive stylus is provided. The discrete circuit multiplexing system includes a stylus body; a first electrode and a second electrode positioned in the stylus body; a shared transmitting sub-system coupled to the first electrode and the second electrode; a first capacitor coupled between the first electrode and the shared transmitting sub-system, with a first node positioned between the first capacitor and the first electrode; a second capacitor coupled between the second electrode and the shared transmitting sub-system, with a second node positioned between the second capacitor and the second electrode; a receiving sub-system coupled to the first electrode and the second electrode; and a microcontroller configured, in response to signals received into the receiving sub-system from the first electrode and the second electrode, to cause selective transmission of waveforms from the shared transmitting sub-system to the first electrode and the second electrode by selectively grounding and floating the first node and the second node, to thereby cause only one of the first electrode and the second electrode to be stimulated at a time.

In this aspect, the microcontroller may be configured to conversely ground and float the first electrode and the second electrode and determine, based on signals received into the receiving sub-system as a result of such converse operation, which of the first and second electrodes is to be selectively stimulated.

In this aspect, the first electrode may be configured to provide an ink mode of operation for the interactive stylus and the second electrode may be configured to provide an erase mode of operation for the interactive stylus.

The invention claimed is:

1. A discrete circuit multiplexing system in an interactive stylus comprising:
 a stylus body;
 a first electrode and a second electrode positioned in the stylus body;
 a shared transmitting sub-system coupled to the first electrode and the second electrode; and
 a microcontroller configured to,
  (i) during a first time interval, selectively stimulate the first electrode by enabling the first electrode and disabling the second electrode; and
  (ii) during a second time interval, selectively stimulate the second electrode by enabling the second electrode and disabling the first electrode;
 where the first and second electrodes are each enabled by permitting voltage pulses from the shared transmission subsystem to be transmitted to the respective electrode; and where the first and second electrodes are each disabled by preventing voltage pulses from the shared transmission subsystem from being transmitted to the respective electrode.

2. The discrete circuit multiplexing system of claim 1, further comprising:
a first capacitor coupled between the shared transmitting sub-system and the first electrode, the microcontroller being configured to disable the first electrode by grounding a first node positioned between the first capacitor and the first electrode and enable the first electrode by floating the first node; and
a second capacitor coupled between the shared transmitting sub-system and the second electrode, the microcontroller being configured to disable the second electrode by grounding a second node positioned between the second capacitor and the second electrode and enable the second electrode by floating the second node.

3. The discrete circuit multiplexing system of claim 1, further comprising a receiving sub-system configured to receive signals from the first electrode and the second electrode, the microcontroller being configured to process such received signals to determine which of the first electrode and the second electrode is to be selectively stimulated by the shared transmitting sub-system.

4. The discrete circuit multiplexing system of claim 3, where the microcontroller is configured to conversely enable and disable the first electrode and the second electrode and determine, based on signals received at the receiving sub-system as a result of such converse operation, which of the first and second electrodes is to be selectively stimulated by the shared transmitting sub-system.

5. The discrete circuit multiplexing system of claim 4, where the microcontroller is configured:
to cause the shared transmitting sub-system to selectively stimulate the first electrode if the receiving sub-system receives a signal greater than a threshold value when the first electrode is enabled and the second electrode is disabled; and
to cause the shared transmitting sub-system to selectively stimulate the second electrode if the receiving sub-system receives a signal greater than a threshold value when the first electrode is disabled and the second electrode is enabled.

6. The discrete circuit multiplexing system of claim 1, where the first electrode is positioned in a first end of the stylus body and the second electrode is positioned in a second end of the stylus body.

7. The discrete circuit multiplexing system of claim 1, further comprising:
a first capacitor coupled between the shared transmitting sub-system and the first electrode;
a first switch configured to ground and unground a first node positioned between the first electrode and the first capacitor;
a second capacitor coupled between the shared transmitting sub-system and the second electrode; and
a second switch configured to ground and unground a second node positioned between the first electrode and the first capacitor.

8. The discrete circuit multiplexing system of claim 1, where in response to a determination of a user's intent to use the first electrode, the microcontroller is configured to disable the second electrode and enable the first electrode so that, when operated, the shared transmitting sub-system stimulates the first electrode; and
where in response to a determination of a user's intent to use the second electrode, the microcontroller is configured to disable the first electrode and enable the second electrode so that, when operated, the shared transmitting sub-system stimulates the second electrode.

9. The discrete circuit multiplexing system of claim 1, where in response to a determination that the first electrode is more proximate to an interactive display than the second electrode, the microcontroller is configured to disable the second electrode and enable the first electrode so that, when operated, the shared transmitting sub-system stimulates the first electrode; and
where in response to a determination that the second electrode is more proximate to an interactive display than the first electrode, the microcontroller is configured to disable the first electrode and enable the second electrode so that, when operated, the shared transmitting sub-system stimulates the second electrode.

10. The discrete circuit multiplexing system of claim 1, where the first electrode is configured to provide an ink mode of operation for the interactive stylus and the second electrode is configured to provide an erase mode of operation for the interactive stylus.

11. A method for operating an interactive stylus having a first electrode and a second electrode, comprising:
receiving, via a receiving sub-system coupled to the first electrode and the second electrode, a signal exceeding an activity threshold value;
in response to the activity threshold value being exceeded, conversely enabling and disabling the first electrode and the second electrode;
during the conversely enabling and disabling, reading levels received at the receiving sub-system to identify which of the first electrode and the second electrode is active; and
selectively stimulating the identified active electrode via waveforms from a shared transmitting sub-system coupled to the first electrode and the second electrode.

12. The method of claim 11, where selectively stimulating the identified active electrode includes enabling the identified active electrode and disabling the other of the first electrode and the second electrode.

13. The method of claim 12, where
a first capacitor is coupled between the shared transmitting sub-system and the first electrode, the first electrode being disabled by grounding a first node between the first capacitor and the first electrode and enabled by floating the first node; and
a second capacitor is coupled between the shared transmitting sub-system and the second electrode, the second electrode being disabled by grounding a second node between the second capacitor and the second electrode and enabled by floating the second node.

14. The method of claim 11, where the first electrode is configured to provide an ink mode of operation for the interactive stylus and the second electrode is configured to provide an erase mode of operation for the interactive stylus.

15. The method of claim 11, where the first electrode is positioned in a first end of the interactive stylus and the second electrode is positioned in a second end of the interactive stylus.

16. The method of claim 11, further comprising disabling a switch between the receiving sub-system and the first electrode and the second electrode while the shared transmitting sub-system stimulates the identified active electrode.

17. A discrete circuit multiplexing system in an interactive stylus, comprising:
- a stylus body;
- a first electrode and a second electrode positioned in the stylus body;
- a shared transmitting sub-system coupled to the first electrode and the second electrode;
- a first capacitor coupled between the first electrode and the shared transmitting sub-system, with a first node positioned between the first capacitor and the first electrode;
- a second capacitor coupled between the second electrode and the shared transmitting sub-system, with a second node positioned between the second capacitor and the second electrode;
- a receiving sub-system coupled to the first electrode and the second electrode; and
- a microcontroller configured, in response to signals received into the receiving sub-system from the first electrode and the second electrode, to cause selective transmission of waveforms from the shared transmitting sub-system to the first electrode and the second electrode by selectively grounding and floating the first node and the second node, to thereby cause only one of the first electrode and the second electrode to be stimulated at a time.

18. The discrete circuit multiplexing system of claim 17, where the microcontroller is configured to conversely ground and float the first electrode and the second electrode and determine, based on signals received into the receiving sub-system as a result of such converse operation, which of the first and second electrodes is to be selectively stimulated.

19. The discrete circuit multiplexing system of claim 17, where the first electrode is configured to provide an ink mode of operation for the interactive stylus and the second electrode is configured to provide an erase mode of operation for the interactive stylus.

* * * * *